Patented July 26, 1949

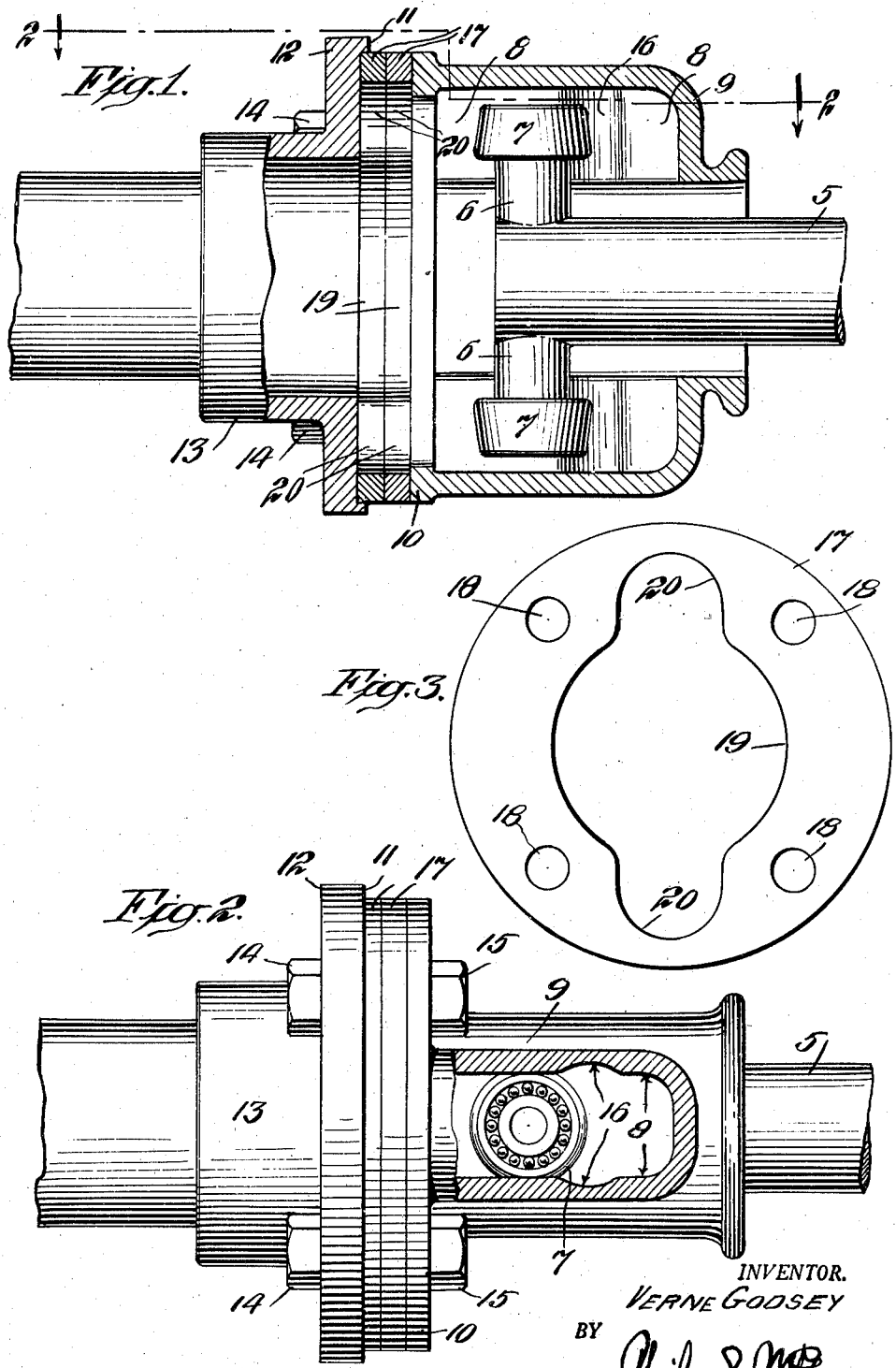

2,477,449

UNITED STATES PATENT OFFICE 2,477,449

MEANS FOR ELIMINATING THE EFFECTS OF WEAR IN UNIVERSAL JOINTS

Verne Godsey, Wichita, Kans.

Application June 2, 1947, Serial No. 751,696

1 Claim. (Cl. 64—8)

The invention disclosed in this patent application relates to universal joints and particularly to those of the type known as the "Detroit universal joint," in which needle bearings carried by the drive shaft operate in guideways provided in the universal joint housings.

The rolls of these needle bearings have a wearing effect on the guideways and the practice has been to substitute an entire new universal joint housing when such guideways have been worn to the point of allowing objectionable slack or lost motion in the joint.

Objects of the present invention are to enable continued use of the universal joint housings even after they have become badly worn, and to provide practical means for eliminating the lost motion caused by such wear.

Special objects of the invention are to provide means of an inexpensive and easily installed character for effecting the above results and which in accomplishing the desired transformation or restoration of operating efficiency will not throw the universal joint out of balance or in any other way detract from its proper and intended performance.

Other desirable objects attained by the invention are set forth or will appear in the course of the following specification.

The drawing accompanying and forming part of the specification illustrates a present commercial embodiment of the invention. Structure, however, may be modified to some extent, all within the true and intended scope of the invention as hereinafter defined and claimed.

Fig. 1 in the drawing is a broken longitudinal sectional view of essential parts of a "Detroit universal joint" having the invention incorporated therein;

Fig. 2 is a broken longitudinal view with portions appearing in section as on substantially the plane of line 2—2 of Fig. 1;

Fig. 3 is a plan or face view of one of the so-called spacers which can be introduced between the companion flanges of the joint to locate the housing in a new wearing position over the needle bearings.

In the type of drive under consideration it is standard practice to provide a universal joint between the transmission and one end of a drive or propeller shaft and another, like universal joint between the other end of the shaft and the differential gear.

For the sake of simplicity, only one of such joints is illustrated, the one between the rear or after end of the shaft and the drive pinion of the differential.

The drive shaft is designated 5 and is shown as having radial arms or prongs 6 carrying the needle bearing rolls 7 operating in the guides 8 of the universal joint housing 9.

The housing 9 is shown as having a flange 10 which in normal practice is seated within the rim 11 of the flange 12 of the pinion drive collar 13.

Normally, also, these two flanges 10 and 12 are directly secured together by bolts 14 and nuts 15.

A spring (not shown), usually interposed between the pinion flange 12 and the end of the drive shaft, centers the parts and allows for necessary freedom of action.

While in operation the needle bearing rolls 7 and guides 8 relatively shift longitudinally, the fact remains that most of the driving is effected with the rolls and guideways in one set relation, resulting in wear on the guides such as indicated at 16 in Figs. 1 and 2.

The grooves or depressions 16 formed in the tracks of the guides, in addition to introducing objectionable lost motion, causes the rolls at times to partially lock in the guides, introducing a dangerous condition in addition to simply causing breakage of parts. As a consequence it has been the practice to throw away these universal joint housings when they show such signs of wear and to replace them with complete new housings.

The present invention avoids such needs for replacement by effecting a relative shifting of housing and needle bearings to locate the points of wear at different and what are relatively "unused" portions of the guides.

Fig. 2 in particular illustrates this point, where it will be noted that the needle bearing rolls 7 are located at a point inward of the housing, away from the wear grooves 16 in the walls of the guide 8.

This relative shifting and relocation of parts is attained by interposing one or more washer-like spacers 17 between the flanges 10 and 12 to effect a permanent shift of the housing away from the pinion gear flange, and thus a location of the needle bearing rolls 7 over new portions of the guide tracks inwardly of those portions formerly engaged by the rolls.

While two spacer discs 17 are shown, only one may ordinarily be needed. These discs may be of various thicknesses, ranging ordinarily from ⅛" to ½" and, as above indicated, only one or any number may be employed, depending upon the location of the points of wear in the universal joint housings.

To avoid adding objectionable weight, the discs may be of aluminum or other light material. They are made with bolt receiving openings 18 to accommodate the same bolts which fasten the flanges together. These bolts are usually long enough to take care of the additional thickness provided by the interposed spacer disc or discs so that the same fastenings, formerly in use, may be employed.

The external diameter of the spacer discs is the same or approximately the same as the outside diameter of the housing flange 10, so as to seat within the rim 11 of the companion flange 12 in the same manner as the flange 10.

Similarly, the spacer discs are made with openings therethrough to generally correspond with the openings in the ends of the housings, approximately as shown in Fig. 3, with a generally circular portion 19 and cutouts 20 in line with the guideways and needle bearing rolls.

The spacers described may be introduced in the universal joints at either or both ends of the drive shaft, depending, of course, upon where the wear is actually located and how much the need for correction. Spacer elements of different thickness and number may be selected and used at such ends, as required.

The installation of the device is relatively simple, involving the unbolting of the two directly connected flanges 10 and 12 and their separation sufficient to admit insertion of one or more washers of selected thickness, and then the rebolting of the flanges together but separated by the interposed positioning medium, using the same fastenings.

The invention is of low cost, can be quickly installed at small expense and renders a relatively expensive piece of equipment usable and, in fact, restored to its original effective condition.

What is claimed is:

In a universal joint of the type in which needle bearing rolls on a drive shaft operate in engagement with guide tracks in a universal joint housing having a flange bolted to the companion flange of a shaft collar and in which the rolls have a tendency to wear cross grooves in the tracks at points of normal engagement of the parts, the hereindisclosed means for eliminating the effect of such wear and restoring the joint to normally effective condition and comprising a spacing disc or discs of the same outline as said flanges secured in fixed relation between said flanges and having a permanent over-all thickness sufficient in such relation to relatively shift said rolls and tracks longitudinally of the joint far enough to displace said rolls from cross grooves worn in the tracks and thereby establishing a new normal relation of the parts with the rolls in such normal position engaging fresh portions of the tracks.

VERNE GODSEY.

REFERENCES CITED

The following references are of record in the file of this patent:

UNITED STATES PATENTS

| Number | Name | Date |
|---|---|---|
| 1,444,628 | Miller | Feb. 6, 1923 |
| 1,987,678 | Goddard et al. | Jan. 15, 1935 |
| 2,057,875 | Benham | Oct. 20, 1936 |
| 2,360,786 | Miquelon | Oct. 17, 1944 |